United States Patent
Lee et al.

(10) Patent No.: US 8,301,147 B2
(45) Date of Patent: Oct. 30, 2012

(54) MOBILE TERMINAL AND HANDOVER METHOD FOR THE MOBILE TERMINAL

(75) Inventors: Jung-Ryun Lee, Seoul (KR); Hyun-Ho Choi, Gyeonggi-Do (KR); Hyun-Sik Kang, Daejeon (KR); Oh-Young Song, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 217 days.

(21) Appl. No.: 12/849,961

(22) Filed: Aug. 4, 2010

(65) Prior Publication Data

US 2011/0183671 A1 Jul. 28, 2011

(30) Foreign Application Priority Data

Jan. 27, 2010 (KR) .................. 10-2010-0007535

(51) Int. Cl.
*H04W 36/00* (2009.01)

(52) U.S. Cl. .................. 455/437; 370/332; 455/450
(58) Field of Classification Search .......... 455/436–444, 455/450; 370/331–334
See application file for complete search history.

(56) References Cited

U.S. PATENT DOCUMENTS 7,502,348 B2 * 3/2009 Zhang et al. .................. 370/331

* cited by examiner

*Primary Examiner* — Vladimir Magloire
(74) *Attorney, Agent, or Firm* — Edwards Wildman Palmer LLP

(57) ABSTRACT

A mobile terminal and a handover method for the mobile terminal are disclosed. A mobile terminal according to an embodiment of the invention may include a control unit configured to control the mobile terminal to perform a handover to a base station based on at least one of an on-off traffic characteristic of downlink data received from the base station and an on-off traffic characteristic of uplink data transmitted to the base station. When certain aspects of the invention are applied, the amount of data loss during a handover can be minimized.

12 Claims, 5 Drawing Sheets

Prior Art

MOBILE TERMINAL AND HANDOVER METHOD FOR THE MOBILE TERMINAL

CROSS-REFERENCE TO RELATED APPLICATIONS

This application claims the benefit of Korean Patent Application No. 10-2010-0007535, filed on Jan. 27, 2010, the disclosure of which is incorporated herein by reference in its entirety.

BACKGROUND

1. Technical Field

Embodiments of the present invention relate to a mobile terminal and a handover method for the mobile terminal, more particularly to a mobile terminal and a handover method for the mobile terminal that can minimize data loss during a handover.

2. Description of the Related Art

A handover refers to a technique that allows a moving terminal (mobile terminal) to continue its current data communication when it moves out of the cell area of one base station and enters the cell area of another base station.

As illustrated in FIG. 1, when a mobile terminal 130 moves out of the cell area of a first base station 110, with which a data communication is currently taking place, and enters the cell area of an adjacent second base station 120, the mobile terminal 130 may perform a handover from the first base station 110 to the second base station 120 in order not to interrupt the data communication.

Handovers can be divided mainly into horizontal handovers (or homogeneous handovers) and vertical handovers (or heterogeneous handovers). A horizontal handover is a handover performed when a mobile terminal moves across networks of the same type, to which the same technology is applied. A vertical handover is a handover performed when a mobile terminal capable of multiple accesses (multiple interfaces) moves across access networks of different types, to which different technology is applied. For example, a vertical handover may be performed when a mobile terminal moves between a WiBro network and a WLAN network, a WLAN network and a CDMA network, or between a 3G network and a WLAN network.

In the case of a vertical handover between access networks of different types, in particular, service disruption may occur during the process of applying different access technology, creating a risk of data loss. However, conventional methods of performing vertical handovers focus mainly on improving the accuracy of handover decisions, such as by mitigating the ping-pong effect, and thus may face difficulties in guaranteeing the QoS (quality of service) in terms of data loss.

SUMMARY

To resolve the problem addressed above, an aspect of the invention provides a mobile terminal and a handover method for the mobile terminal that can minimize data loss during a handover.

To achieve the objective above, an embodiment of the invention provides a mobile terminal that includes a control unit configured to control the mobile terminal to perform a handover to a base station based on at least one of an on-off traffic characteristic of downlink data received from the base station and an on-off traffic characteristic of uplink data transmitted to the base station.

In this case, the control unit can perform all of or a part of the handover when at least one of the downlink data traffic and the uplink data traffic is in an off state.

Also, the handover can include a pre-registration operation, a detachment operation, an attachment operation, and a re-registration operation, while the control unit can perform the detachment operation and the attachment operation when at least one of the downlink data traffic and the uplink data traffic is in an off state.

Also, the handover can be a vertical handover.

The downlink data and the uplink data can be VoIP (Voice over Internet Protocol) data.

Another embodiment of the invention provides a handover method for a mobile terminal that includes: measuring a reception strength of downlink data received from a base station, and controlling the mobile terminal to perform a handover to the base station when the reception strength of the downlink data is greater than a preset threshold strength, where controlling the handover to the base station includes controlling the mobile terminal to perform the handover to the base station based on at least one of an on-off traffic characteristic of the downlink data and an on-off traffic characteristic of uplink data transmitted to the base station.

Additional aspects, embodiments, and advantages of the invention will be set forth in part in the description which follows, and in part will be obvious from the description, or may be learned by practice of the invention.

DETAILED DESCRIPTION

Figure 1:
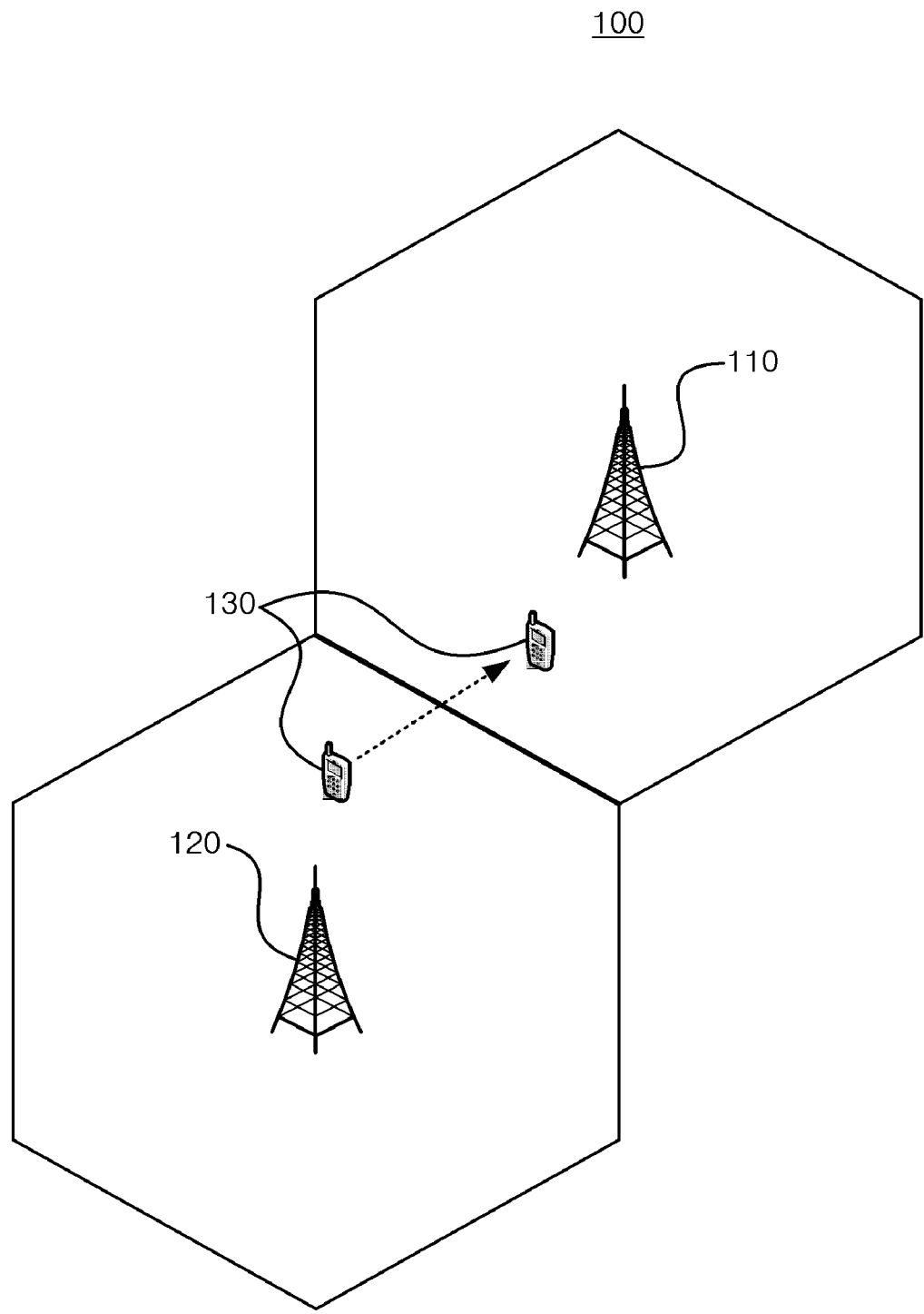
FIG. 1 schematically illustrates a communication system according to the related art.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like numerals are used to refer to like elements.

Certain embodiments of the invention will be described below in more detail with reference to the accompanying drawings. For better understanding, the same elements are indicated by the same numerals regardless of the figure number.

Figure 2:
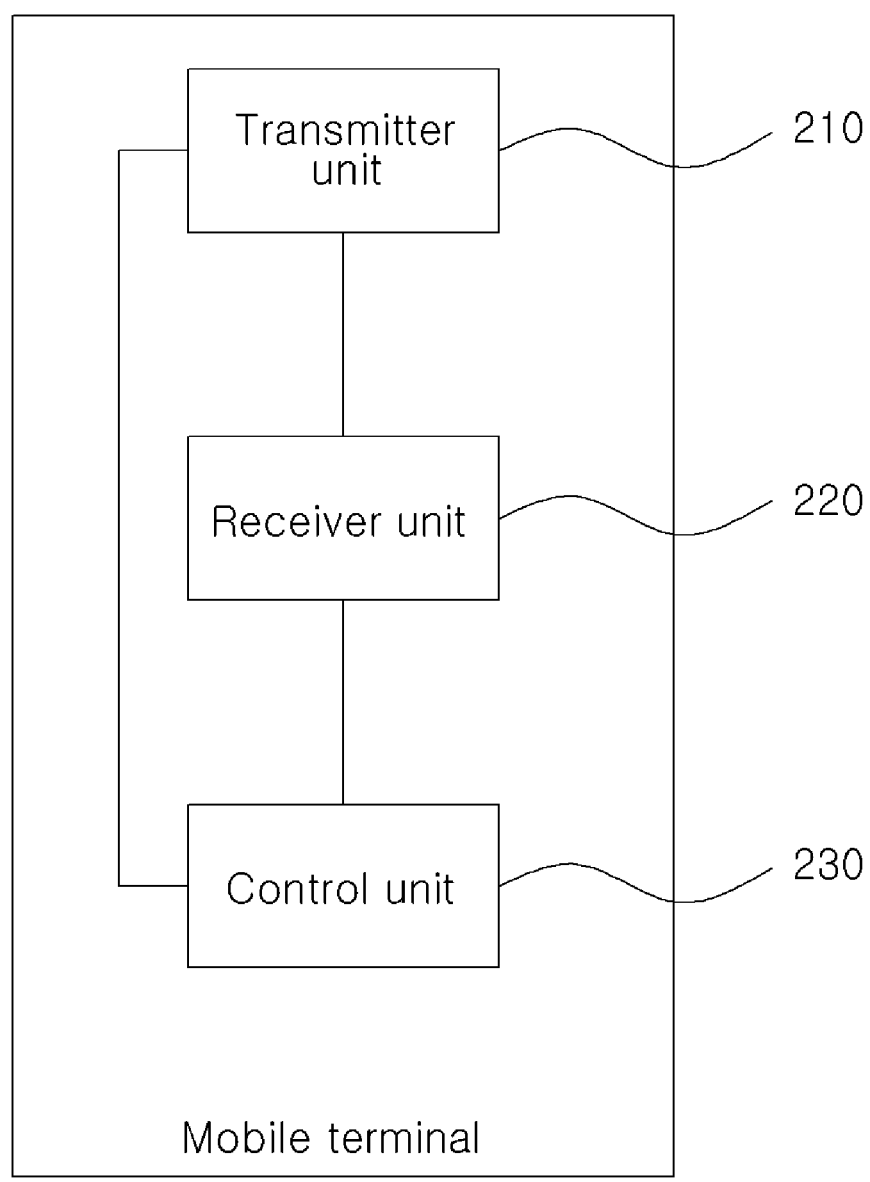
FIG. 2 is a block diagram illustrating the composition of a mobile terminal according to an embodiment of the invention.

FIG. 2 is a block diagram illustrating the composition of a mobile terminal according to an embodiment of the invention.

Referring to FIG. 2, a mobile terminal 200 according to an embodiment of the invention may include a transmitter unit 210, a receiver unit 220, and a control unit 230. A detailed description will be provided as follows on the function of each element.

While it is not illustrated in FIG. 2, it will be assumed that the mobile terminal 200 is moving into a cell area of a base station and performing a handover to the base station.

The transmitter unit 210 and receiver unit 220 may exchange data with the base station. That is, the transmitter unit 210 may transmit uplink data to the base station, and the receiver unit 220 may receive downlink data from the base station.

The control unit 230 may control the mobile terminal 200 such that the mobile terminal 200 performs a handover to a second base station based on at least one of the on-off traffic characteristic of the downlink data received from the base station and the on-off traffic characteristic of the uplink data transmitted to the base station.

The on-off traffic characteristic of data refers to the characteristic of how the data's transmission and non-transmission state is repeated in relation to time. In other words, the data may be transmitted (on state) in one time segment, while the data may not be transmitted or only a small amount of data may be transmitted (off state) in another time segment. Such transmission characteristic of the data is referred to as the on-off traffic characteristic of the data. For example, an application such as a VoIP (Voice over Internet Protocol) codec may intermittently refrain from producing data, by way of an operating mechanism such as voice activity detection and silence suppression, and therefore, VoIP data may have an on-off traffic characteristic.

That is, the mobile terminal 200 according to an embodiment of the invention may minimize data loss by suitably utilizing the data transmission segments and data non-transmission segments in performing a handover.

To further elaborate, the control unit 230 may perform all or a part of the handover, when at least one of the downlink data traffic and the uplink data traffic (preferably, both the downlink data traffic and uplink data traffic) is in an off state.

That is, since there is no data exchange between the mobile terminal 200 and the base station when both the downlink data traffic and the uplink data traffic are in an off state, the amount of data lost can be reduced by having the control unit 230 control the mobile terminal 200 to perform the handover to the base station within the time segment during which there is no data exchange.

According to an embodiment of the invention, the handover performed by the mobile terminal 200 can be a vertical handover or a horizontal handover. That is, a handover method according to an embodiment of the invention can be applied to both cases where the mobile terminal 200 moves across networks of the same type and where the mobile terminal 200 moves across networks of different types.

A description will now be provided as follows, with reference to FIG. 3, on an example in which a mobile terminal 200 according to an embodiment of the invention performs a handover to a base station based on the on-off traffic characteristics of the downlink data and of the uplink data.

Figure 3:
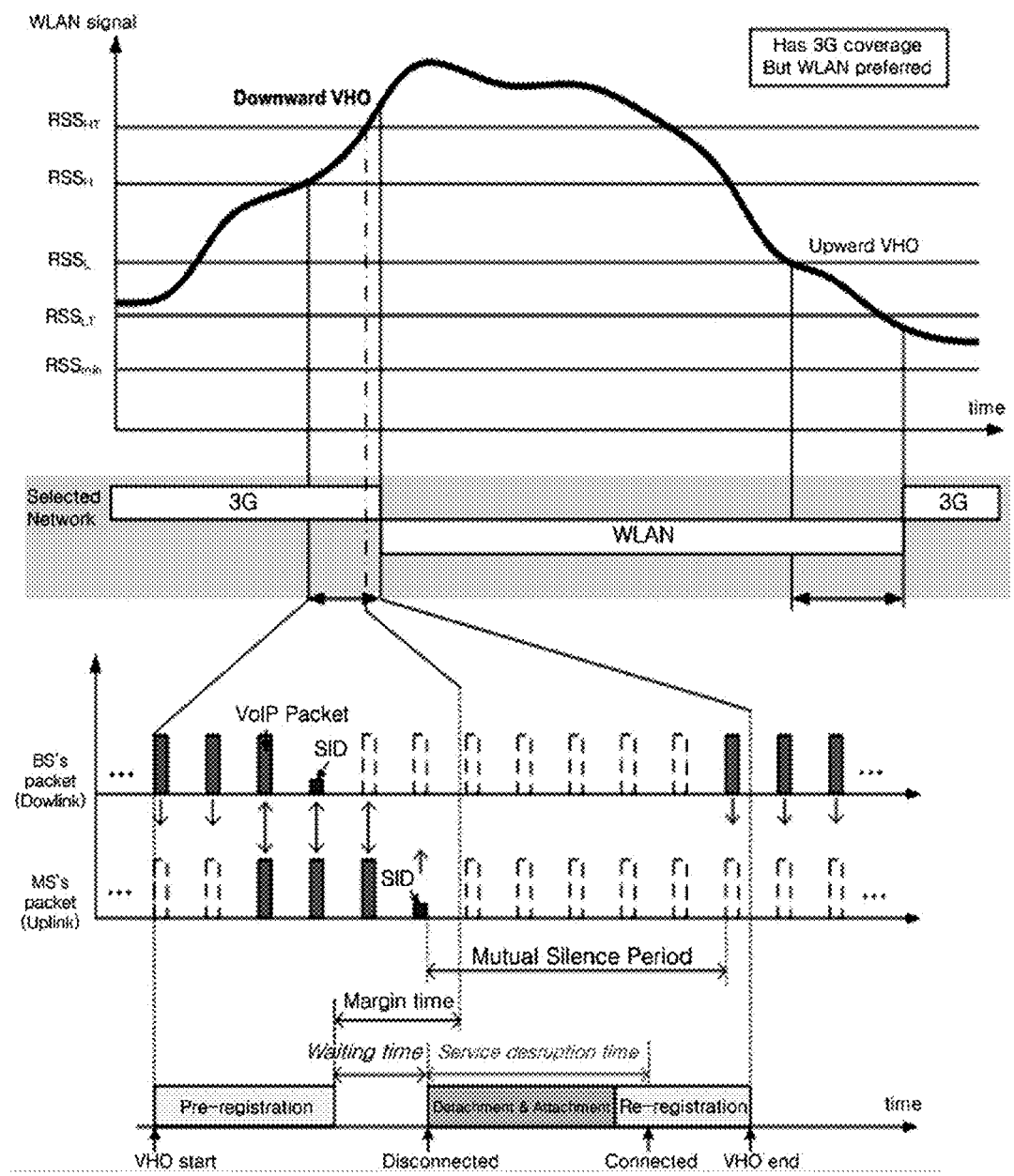
FIG. 3 illustrates a vertical handover performed when a mobile terminal 200 according to an embodiment of the invention is transferred between a 3G network and a WLAN network.

FIG. 3 illustrates a vertical handover performed when a mobile terminal 200 according to an embodiment of the invention is transferred between a 3G network and a WLAN network.

Here, it will be assumed that the uplink data and the downlink data are VoIP data.

Referring to the graph shown in the upper part of FIG. 3, the mobile terminal 200 may be initially located within a 3G network, and may receive 3G signals from the 3G network while at the same time receiving WLAN signals from an adjacent WLAN network.

Afterwards, the mobile terminal 200 may move from the 3G network to the WLAN network, and accordingly, the RSS (received signal strength) of the WLAN signals may continuously increase. If the RSS of the WLAN signals exceeds RSSH, which is a preset threshold strength, then the vertical handover (downward VHO) may begin.

When performing a vertical handover to a WLAN network, the mobile terminal 200 may determine the on-off state of the downlink data traffic by analyzing the VoIP data (VoIP packets) included in the WLAN signals received. Concurrently, the mobile terminal 200 may also determine the on-off state of the uplink data traffic it is transmitting to the WLAN network to perform the vertical handoff.

As illustrated in the lower part of FIG. 3, the vertical handover may include a pre-registration operation, a detachment operation, an attachment operation, and a re-registration operation.

Based on the foregoing, a more detailed description will be provided as follows on the vertical handover performed by the mobile terminal.

First, when the vertical handover (downward VHO) to the WLAN network begins, the control unit 230 may make a pre-register to the WLAN network.

After completing the pre-registration, the control unit 230 may perform the detachment and attachment, based on the analyzed downlink data traffic state and uplink data traffic state.

That is, the control unit 230 may perform the detachment and attachment when at least one of the downlink data traffic and the uplink data traffic (preferably, both the downlink data traffic and uplink data traffic) is in an off state. For easier description, the case in which both the downlink data traffic and the uplink data traffic are in an off state will be referred to as a "mutual silence" state.

To further elaborate, after performing the pre-registration, the control unit 230 may stand by for a certain amount of time instead of immediately performing the detachment and attachment, to perform the detachment and attachment later when a mutual silence state begins.

Consequently, the time after performing the detachment until the final completion of the handover during which the mobile terminal cannot receive data from either the 3G network or the WLAN network, i.e. the service disruption time, may be aligned with the mutual silence period, so that the loss of data can be minimized.

However, if the mobile terminal were to stand by without performing the detachment and attachment operations until there is a mutual silence state, even when there is a large interval between the completion point of the pre-registration and the starting point of the mutual silence state, then the overall time used in performing the handover may be increased, and the amount of data loss may even be increased.

Thus, according to an embodiment of the invention, the control unit 230 can determine whether or not a mutual silence state begins (i.e. an off state of the downlink data traffic and an off state of the uplink data traffic begins) within a preset margin time from the point of completion of the pre-registration, and can decide the starting point of the detachment and attachment operations accordingly. Here, the margin time refers to the maximum amount of time by which the control unit 230 can delay the handover.

That is, if a mutual silence state begins within the margin time, the control unit 230 may start the detachment and attachment at the point at which the mutual silence state begins (i.e. the later of the starting point of an off state of the downlink data traffic and the starting point of an off state of the uplink data traffic), and if a mutual silence state is not begun within the margin time (i.e. either one of the off state of the downlink data traffic or the off state of the uplink data traffic does not begin), the control unit 230 may start the detachment and attachment at the point at which the margin time ends.

As a result, if there is a large interval between the completion point of o the pre-registration and the starting point of the mutual silence state, then the control unit 230 may no longer stand by and may perform the detachment and the attachment, whereby the problem of excessive prolonging of the overall time used for performing the handover may be resolved.

Also, according to an embodiment of the invention, the control unit 230 may determine whether or not the downlink data traffic is in an off state based on an SID (silence insertion descriptor) frame received from the base station and determine whether or not the uplink data traffic is in an off state based on an SID frame transmitted to the WLAN network, to identify the starting point of a mutual silence state.

After completing the detachment and the attachment in accordance with the procedures above, the control unit 230 may perform re-registration, and consequently the vertical handover from the 3G network to the WLAN network may be completed.

Figure 4:
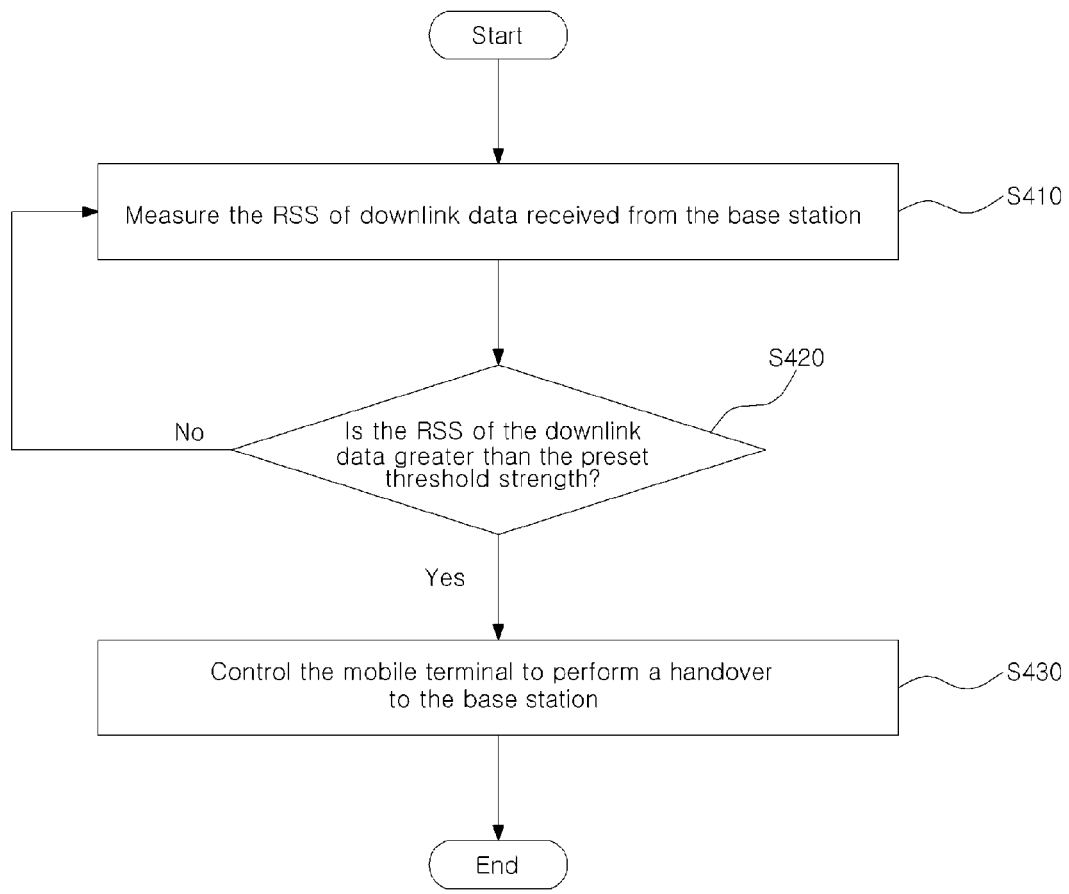
FIG. 4 and FIG. 5 are flowcharts illustrating the overall process of a handover method for a mobile terminal according to an embodiment of the invention.
Figure 5:
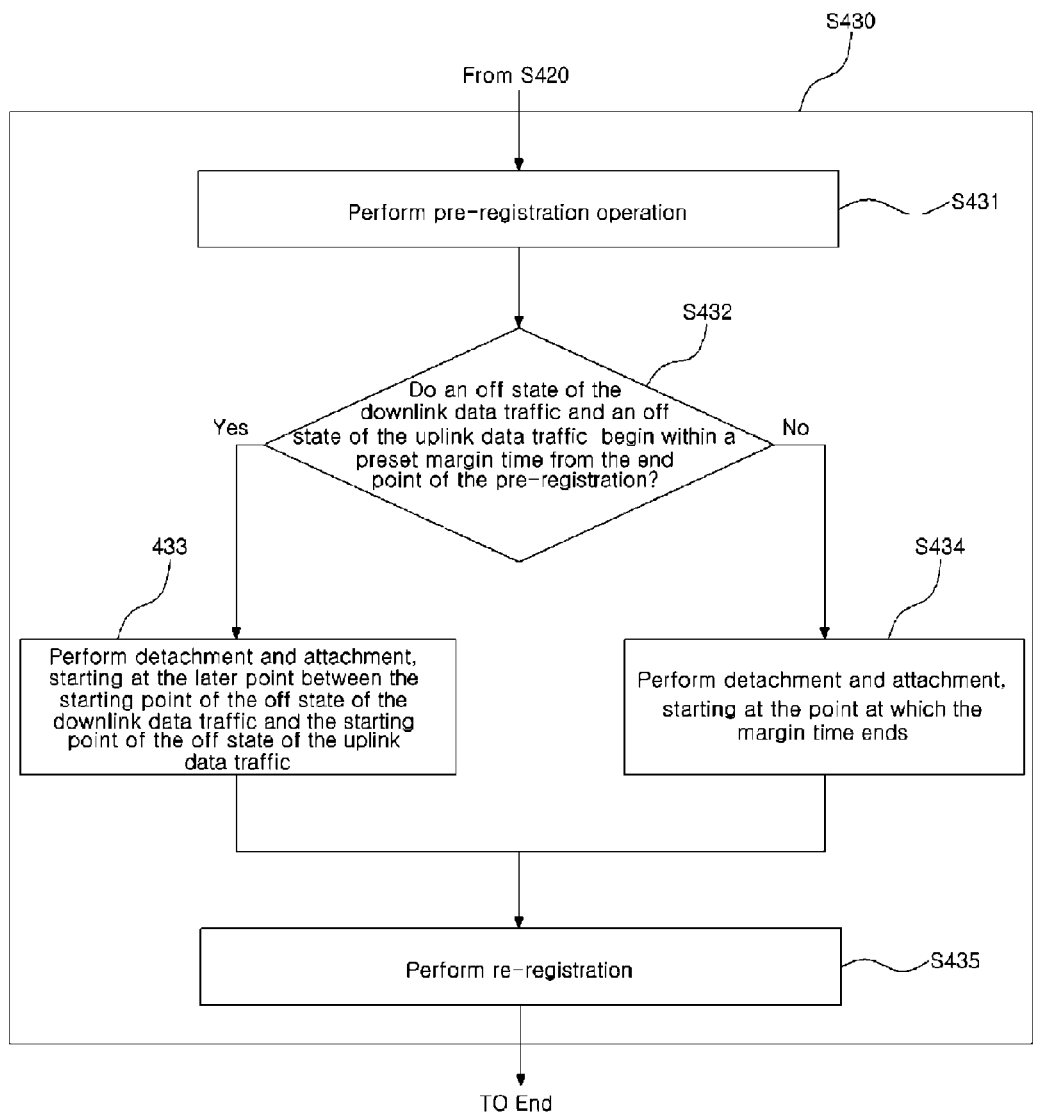

FIG. 4 and FIG. 5 are flowcharts illustrating the overall process of a handover method for a mobile terminal according to an embodiment of the invention. A description will be provided as follows, with reference to FIG. 4 and FIG. 5, on the procedures performed for each operation.

First, as shown in FIG. 4, the RSS of the downlink data received from the base station may be measured in operation S410.

Afterwards, in operation S420, it may be determined whether or not the RSS of the downlink data is greater than a preset threshold strength.

If, in operation S420, it is determined that the RSS of the downlink data is smaller than the threshold strength, then operation S410 may be performed again. On the other hand, if it is determined in operation S420 that the RSS of the downlink data is greater than the threshold strength, then the mobile terminal may be controlled to perform a handover to the base station in operation S430.

A more detailed description of operation S430 with reference to FIG. 5 is provided as follows.

First, in operation S431, pre-registration may be performed.

Next, in operation S432, it may be determined whether or not an off state of the downlink data traffic and an off state of the uplink data traffic (i.e. a mutual silence state) begin within a preset margin time from the end point of the pre-registration.

If, in operation S432, it is determined that the mutual silence state begins within the margin time, then the detachment and the attachment may be performed in operation S433, starting at the later point between the starting point of the off state of the downlink data traffic and the starting point of the off state of the uplink data traffic (i.e. at the starting point of the mutual silence state).

On the other hand, if it is determined in operation S432 that the mutual silence state does not begin within the margin time, then the detachment and the attachment may be performed in operation S434, starting at the point at which the margin time ends.

Finally, in operation S435, re-registration may be performed. Thus, the handover of the mobile terminal may be completed.

A description has been provided above on embodiments of a handover method for a mobile terminal according to an aspect of the invention. The composition of the mobile terminal described earlier with reference to FIG. 2 and FIG. 3 can also be applied to the present embodiment.

The embodiments of the invention can be implemented in the form of a program of instructions executable by various computer means and can be recorded on a computer-readable medium. The computer-readable medium can include a program of instructions, data files, data structures, etc., or a combination thereof. The program of instructions recorded on the medium can be such that is especially designed for the present invention or is available to the skilled person in the computer software industry. Examples of a computer-readable recording medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the invention has been described above using particular items, such as specific elements, etc., and limited embodiments and drawings, these are merely provided to aid the overall understanding of the invention. The invention is not to be limited to the above embodiments, and those of ordinary skill in the art may conceive various modifications and alterations from the above disclosure. As such, the spirit of the invention is not to be defined only by the embodiments described above, and it is to be appreciated that not only the scope of claims set forth below but also their equivalents and substantially equivalent variations are encompassed within the spirit of the invention.

What is claimed is:

1. A mobile terminal comprising:
    a control unit configured to control the mobile terminal to perform a handover to a base station based on at least one of an on-off traffic characteristic of downlink data received from the base station and an on-off traffic characteristic of uplink data transmitted to the base station,
    wherein the control unit performs all of or a part of the handover, when at least one of the downlink data traffic and the uplink data traffic is in an off state,
    wherein the handover comprises a pre-registration operation, a detachment operation, an attachment operation, and a re-registration operation, and the control unit performs the detachment operation and the attachment operation, when at least one of the downlink data traffic and the uplink data traffic is in an off state,
    wherein the control unit performs the pre-registration operation, when a reception strength of the downlink data is greater than a preset threshold strength, and begins the detachment operation and the attachment operation at a later point between a starting point of an off state of the downlink data traffic and a starting point of an off state of the uplink data traffic, when the off state of the downlink data traffic and the off state of the uplink data traffic are started within a preset margin time from an end point of the pre-registration operation.

2. The mobile terminal according to claim 1, wherein the control unit performs the pre-registration operation when a reception strength of the downlink data is greater than a preset threshold strength, and begins the detachment operation and the attachment operation at a point at which a preset margin time ends, when any one of an off state of the downlink data traffic and an off state of the uplink data traffic is not started within the margin time from an end point of the pre-registration operation.

3. The mobile terminal according to claim 1, wherein the control unit determines whether or not the downlink data traffic is in an off state based on an SID (silence insertion descriptor) frame received from the base station, and determines whether or not the uplink data traffic is in an off state based on an SID frame transmitted to the base station.

4. The mobile terminal according to claim 2, wherein the control unit determines whether or not the downlink data traffic is in an off state based on an SID (silence insertion descriptor) frame received from the base station, and determines whether or not the uplink data traffic is in an off state based on an SID frame transmitted to the base station.

5. The mobile terminal according to claim 1, wherein the handover is a vertical handover.

6. The mobile terminal according to claim 1, wherein the downlink data and the uplink data are VoIP (Voice over Internet Protocol) data.

7. A handover method for a mobile terminal, the method comprising:
    measuring a reception strength of downlink data received from a base station; and
    controlling the mobile terminal to perform a handover to the base station, when the reception strength of the downlink data is greater than a preset threshold strength, wherein,
    the handover comprises a pre-registration operation, a detachment operation, an attachment operation, and a re-registration operation, and
    controlling the handover to the base station comprises:
    performing the pre-registration operation, when the reception strength of the downlink data is greater than a preset threshold strength,
    and beginning the detachment operation and the attachment operation at a later point between a starting point of an off state of the downlink data traffic and a starting point of an off state of the uplink data traffic, when the off state of the downlink data traffic and the off state of the uplink data traffic are started within a preset margin time from an end point of the pre-registration operation.

8. The method according to claim 7, wherein controlling the handover to the base station comprises:
    performing the pre-registration operation when the reception strength of the downlink data is greater than a preset threshold strength,
    and beginning the detachment operation and the attachment operation at a point at which a preset margin time ends, when any one of an off state of the downlink data traffic and an off state of the uplink data traffic is not started within the margin time from an end point of the pre-registration operation.

9. The method according to claim 7, wherein controlling the handover to the base station comprises:
    determining whether or not the downlink data traffic is in an off state based on an SID (silence insertion descriptor) frame received from the base station,
    and determining whether or not the uplink data traffic is in an off state based on an SID frame transmitted to the base station.

10. The method according to claim 8, wherein controlling the handover to the base station comprises:
    determining whether or not the downlink data traffic is in an off state based on an SID (silence insertion descriptor) frame received from the base station,
    and determining whether or not the uplink data traffic is in an off state based on an SID frame transmitted to the base station.

11. The method according to claim 7, wherein the handover is a vertical handover.

12. The method according to claim 7, wherein the downlink data and the uplink data are VoIP (Voice over Internet Protocol) data.

* * * * *